US012760887B2

(12) United States Patent
Wei et al.

(10) Patent No.: US 12,760,887 B2
(45) Date of Patent: Oct. 13, 2026

(54) CEILING-MOUNTED FAN LIGHT AND ASSEMBLY METHOD THEREFOR

(71) Applicant: Wenbo Wei, Guangxi (CN)

(72) Inventors: Wenbo Wei, Guangxi (CN); Fengying Tang, Guangxi (CN)

(73) Assignee: Wenbo Wei, Guangxi (CN)

( * ) Notice: Subject to any disclaimer, the term of this patent is extended or adjusted under 35 U.S.C. 154(b) by 0 days.

(21) Appl. No.: 19/314,314

(22) Filed: Aug. 29, 2025

(65) Prior Publication Data

US 2025/0383077 A1 Dec. 18, 2025

(30) Foreign Application Priority Data

Dec. 31, 2024 (CN) ........................ 202423320293.X

(51) Int. Cl.

| | |
|---|---|
| ***F21V 33/00*** | (2006.01) |
| ***F21S 4/28*** | (2016.01) |
| ***F21S 8/04*** | (2006.01) |
| ***F21V 17/12*** | (2006.01) |
| ***F21V 23/06*** | (2006.01) |
| *F21Y 103/33* | (2016.01) |

(52) U.S. Cl.
CPC ............ *F21V 33/0096* (2013.01); *F21S 4/28* (2016.01); *F21S 8/043* (2013.01); *F21V 17/12* (2013.01); *F21V 23/06* (2013.01); *F21Y 2103/33* (2016.08)

(58) Field of Classification Search
CPC ...... F21V 23/06; F21V 17/12; F21V 33/0096; F21S 8/043
See application file for complete search history.

(56) References Cited

U.S. PATENT DOCUMENTS 12,326,235 B1 * 6/2025 Zheng ..................... F21S 8/043
12,345,393 B1 * 7/2025 Zheng .................. F21V 17/164

FOREIGN PATENT DOCUMENTS

CN 113958932 A * 1/2022 ........... F21V 21/002

* cited by examiner

*Primary Examiner* — Anabel Ton
(74) *Attorney, Agent, or Firm* — Law Offices of Sandy Lipkin; Sandy Lipkin

(57) ABSTRACT

The present invention discloses a ceiling-mounted fan light and an assembly method therefor. The ceiling-mounted fan light includes a ceiling-mounted box, a fan installed on the ceiling box, some light arms detachably assembled to the ceiling box, an arc-shaped lamp bracket provided at an extended end of each light arm, and lamp brackets. A connecting member is arranged between the head end of one lamp bracket and the tail end of an adjacent lamp bracket, so that the lamp brackets and light arms can be disassembled and reassembled during packaging and transportation by separating them into individual components to reduce space, while also reducing molding costs. The corresponding lamp groove provided on a lower side and/or an upper side of the lamp bracket is mounted by light-transmitting strip respectively to enable diverse lighting effects.

9 Claims, 13 Drawing Sheets

CEILING-MOUNTED FAN LIGHT AND ASSEMBLY METHOD THEREFOR

CROSS-REFERENCE TO RELATED APPLICATIONS

The application claims priority of Chinese patent application CN202423320293X, filed on Dec. 31, 2024, which is incorporated herein by reference in its entirety.

TECHNICAL FIELD

The present invention relates to the technical field of lighting equipment, in particular, to a ceiling-mounted fan light and an assembly method therefor.

BACKGROUND

Ceiling-mounted fan lights, as common indoor equipment, are widely used in daily life. However, conventional ceiling-mounted fan lights exhibit drawbacks during transport: due to fixed structures in which lamp brackets and light arms are typically an integral unit, this configuration occupies excessive space, not conducive to packaging and transportation and prone to damage during transport. Additionally, the structural complexity increases mold manufacturing costs.

SUMMARY

In view of the above, an objective of the present invention is to provide a ceiling-mounted fan light that enables disassembly and reassembly of lamp brackets and light arms to facilitate transport and save packaging space, and provide an assembly method therefor.

The technical solution adopted in the present invention to address the technical problem is as follows:

A ceiling-mounted fan light and an assembly method therefor. The ceiling-mounted fan light includes: a ceiling box and a fan disposed on the ceiling box; characterized in that a plurality of light arms are detachably assembled to the ceiling box; an arc-shaped lamp bracket is provided at an extended end of each of the plurality of light arms; the lamp bracket includes a head end and a tail end, and a connecting member is arranged between the head end of one lamp bracket and the tail end of an adjacent lamp bracket to enable a connection between the lamp bracket and the adjacent lamp bracket; the connection between the lamp bracket and the adjacent lamp bracket forms a ring.

In a preferred embodiment of the present invention, the ceiling-mounted fan light is characterized in that: a lamp groove is provided on a lower side and/or an upper side of the lamp bracket; a light source is disposed within the lamp groove; and a light-transmitting strip covering the lamp groove is provided at the lamp groove on the lamp bracket, and the light-transmitting strip includes a first flange engaged with the lamp groove.

In a preferred embodiment of the present invention, a plug is provided on an outer sidewall of the ceiling box; a socket engaged with the plug is provided on the light arm; a second flange is provided at an end of the light arm connected to the ceiling box, the second flange is provided with a first threaded hole; and a second threaded hole is provided within the ceiling box to match the first threaded hole.

In a preferred embodiment of the present invention, the connecting member includes a first clamping plate disposed on an inner side of the lamp bracket and a second clamping plate disposed on an outer side of the lamp bracket; a first through hole extending outward is provided at the head end and the tail end of the lamp bracket; a third threaded hole communicating with the first through hole is provided on each of left and right sides of the first clamping plate, where the third threaded hole at the left side of the first clamping plate communicates with the first through hole on the lamp bracket at the left side, and the third threaded hole at the right side of the first clamping plate communicates with the first through hole on the lamp bracket at the right side; and a fourth threaded hole communicating with the first through hole is provided on each of left and right sides of the second clamping plate, where the fourth threaded hole at the left side of the second clamping plate communicates with the first through hole on the lamp bracket at the left side, and the fourth threaded hole at the right side of the second clamping plate communicates with the first through hole on the lamp bracket at the right side.

In a preferred embodiment of the present invention, the lamp groove is provided on both upper and lower sides of the lamp bracket; a first protrusion is provided on an upper side of both the head end and the tail end of the lamp bracket; a second protrusion is provided on a lower side of each of two ends of the lamp bracket; a first slot mounting the light-transmitting strip is formed between the first protrusions at both ends; and a second slot mounting the light-transmitting strip is formed between the second protrusions at both ends.

In a preferred embodiment of the present invention, the first through holes are respectively provided on upper and lower sides of the lamp bracket, where the upper first through hole is provided at the first protrusion, and the lower first through hole is provided at the second protrusion.

In a preferred embodiment of the present invention, the connecting member includes a U-shaped insert groove disposed between adjacent lamp brackets; and a connection structure is provided between the U-shaped insert groove and the lamp bracket to enable end-to-end docking of adjacent lamp brackets.

In a preferred embodiment of the present invention, the connection structure is a tenon-and-mortise connection structure including: a tenon provided on the U-shaped insert groove, and a mortise provided at the head end and the tail end of the lamp bracket and riveted to the tenon; an L-shaped groove is provided on each of left and right sides of a bottom of the light-transmitting strip; and an elastic fastener engageable with the L-shaped groove is provided on each of left and right sides of the U-shaped insert groove.

In a preferred embodiment of the present invention, the connection structure is a threaded connection structure including: an H-shaped protrusion provided on the U-shaped insert groove, a T-shaped slot provided at the head end and the tail end of the lamp bracket and engaged with the H-shaped protrusion, and a locking screw provided at the head end and the tail end of the lamp bracket to lock the H-shaped protrusion within the T-shaped slot; a sixth threaded hole engaged with the locking screw is provided on the H-shaped protrusion.

In a preferred embodiment of the present invention: a ceiling cover is detachably assembled to the ceiling box; an L-shaped groove is provided on an outer sidewall of the ceiling cover; a limit protrusion engaged with the L-shaped groove is provided on an inner sidewall of the ceiling box; a second through hole is provided on a sidewall of the ceiling box at the limit protrusion position; and a fifth threaded hole communicating with the second through hole is provided on the ceiling cover.

The present invention further provides an assembly method for a ceiling-mounted fan light, adopting the fan light as described above, where the assembly method includes the following steps:

S101. Assembling the light arms with the ceiling box: aligning the socket on the light arm with the plug on the outer sidewall of the ceiling box for snap-fit engagement, the first threaded hole on the second flange at the end of the light arm connected to the ceiling box is aligned with the second threaded hole inside the ceiling box, and securing the light arms to the ceiling box by threaded connection using screws;

S102. Assembling the lamp bracket, the light-transmitting strip, and the light source: adhering the light source to the bottom surface of the lamp groove, covering the lamp groove with the light-transmitting strip, and fixing it to the lamp bracket by threaded connection through the threaded hole on the first flange;

S103. Assembling lamp brackets: docking the head end of one lamp bracket with the tail end of an adjacent lamp bracket, and connecting the head end of one lamp bracket and the tail end of an adjacent lamp bracket through a connecting member; to connect the lamp brackets into a ring; and

S104. Assembling the ceiling cover with the ceiling box: aligning the L-shaped groove on the ceiling cover with the limit protrusion on the inner sidewall of the ceiling box, to clamp the serrated protrusion on the lower sidewall of the L-shaped groove to the limit protrusion, where the fifth threaded hole on the ceiling cover communicates with the second through hole at the limit protrusion on the sidewall of the ceiling box, securing the ceiling cover to the ceiling box by threaded connection using screws, and mounting the fan onto the ceiling box.

The present invention offers the beneficial effects of enhancing structural stability and aesthetics as the ceiling-mounted fan light includes a ceiling box and a fan, where a plurality of light arms are detachably assembled to the ceiling box; an arc-shaped lamp bracket is provided at an extended end of each light arm; the lamp bracket includes a head end and a tail end, and a connecting member is arranged between the head end of one lamp bracket and the tail end of an adjacent lamp bracket to enable a connection between the lamp bracket and the adjacent lamp bracket; the connection between the lamp bracket and the adjacent lamp bracket forms a ring, so that the lamp brackets and light arms can be disassembled and reassembled during packaging and transportation by separating them into individual components to reduce space, while also reducing molding costs. The corresponding lamp groove provided on a lower side and/or an upper side of the lamp bracket is mounted by light-transmitting strip respectively to enable diverse lighting effects.

BRIEF DESCRIPTION OF DRAWINGS

In order to provide a clearer explanation of the technical solution in the embodiments of the present application, a brief introduction will be given below to the drawings required in the description of the embodiments.

DESCRIPTION OF EMBODIMENTS

Figure 1:
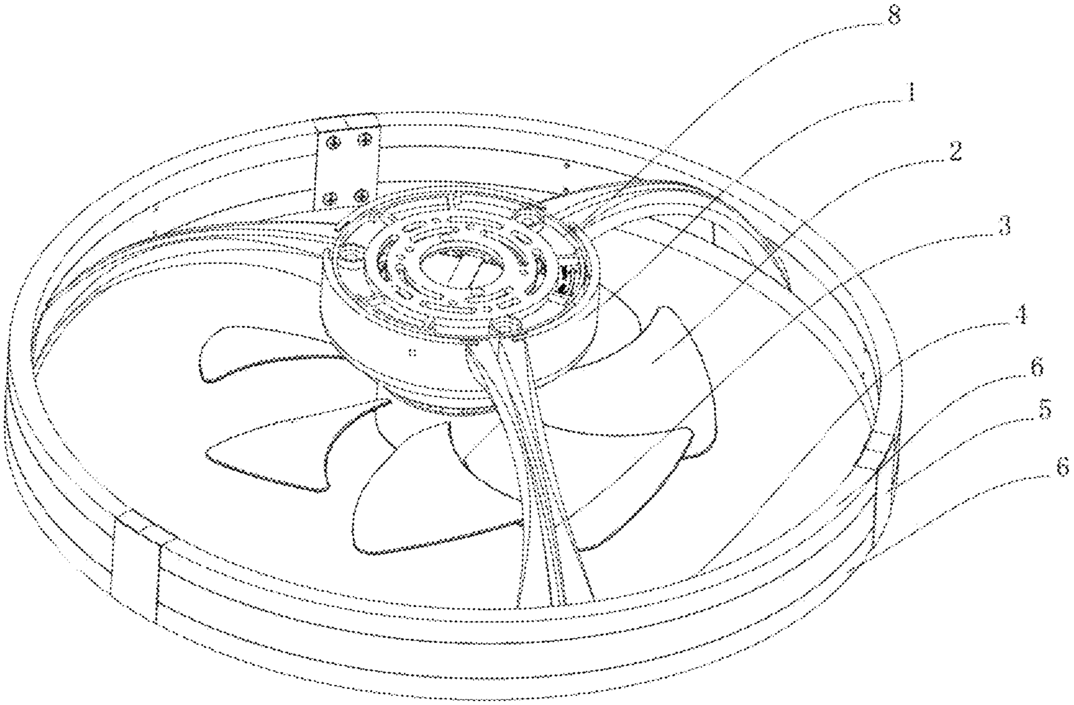
FIG. 1 is a schematic view of Embodiment 1 of the present invention.

The technical solutions in the embodiments of the present invention will be clearly and fully described below with reference to the accompanying drawings.

With reference to FIG. 1 to FIG. 10, a ceiling-mounted fan light and an assembly method therefor are provided. The ceiling-mounted fan light includes a ceiling box 1 and a fan 2 arranged on the ceiling box 1, where a plurality of light arms 3 are detachably assembled to the ceiling box 1; a lamp bracket 4 is provided at an extended end of each of the plurality of light arms 3, the lamp bracket is arc-shaped; the lamp bracket includes a head end and a tail end, and a connecting member 5 is arranged between the head end of one lamp bracket and the tail end of an adjacent lamp bracket 4 to enable a connection between the lamp bracket and the adjacent lamp bracket; the connection between the lamp bracket 4 and the adjacent lamp bracket 4 forms a ring, thereby enhancing structural stability and aesthetics. The detachable design allows disassembly and assembly of the lamp brackets 4 and light arms 3 and disassembles the lamp brackets 4 and light arms 3 into units during packaging and transport, significantly reducing space and facilitating packaging and transport. This also lowers mold manufacturing costs.

Figure 2:
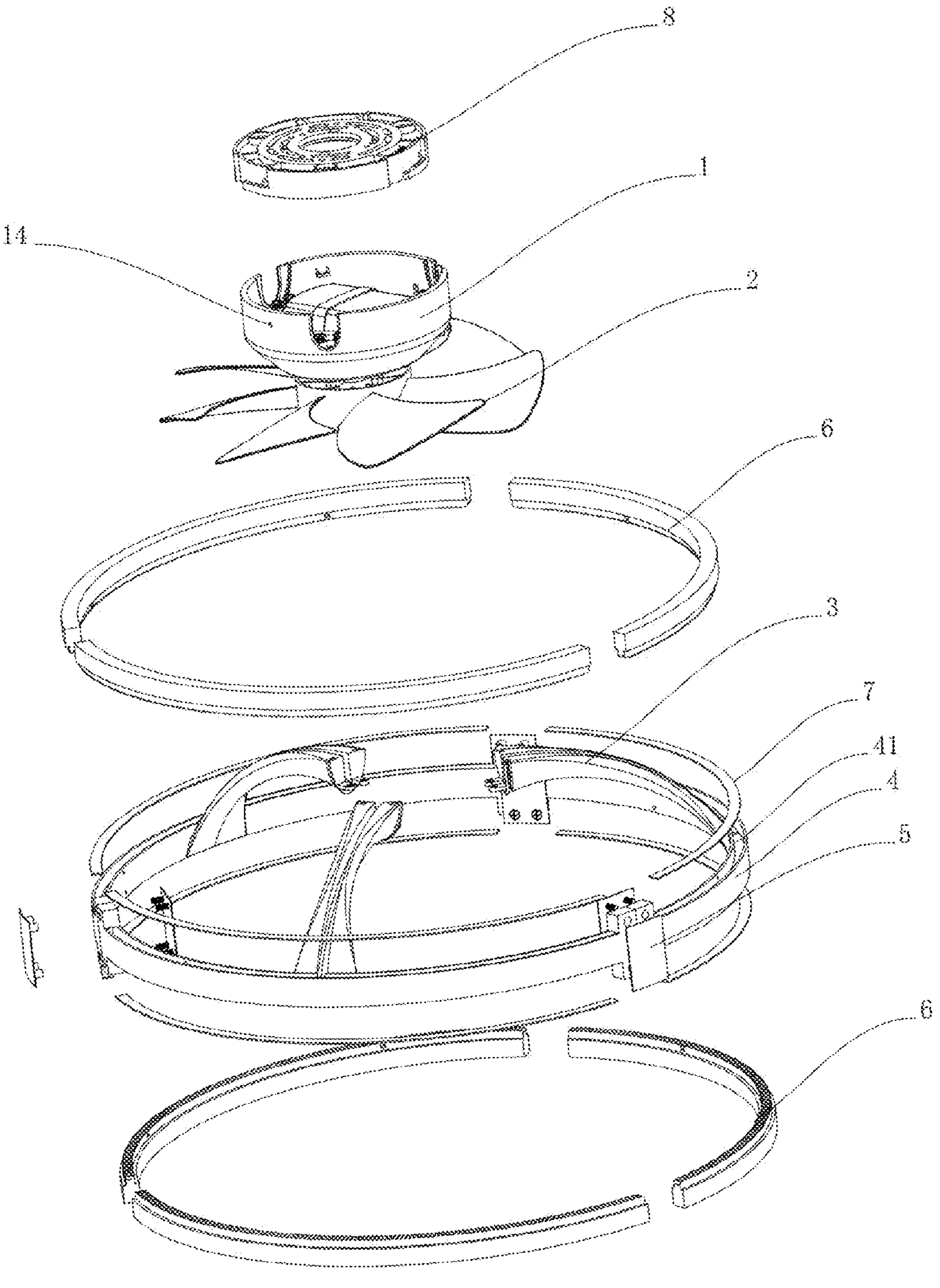
FIG. 2 is an exploded view of Embodiment 1 of the present invention.

With reference to FIG. 2, in this solution, a lamp groove 41 is provided on an upper and/or a lower side of the lamp bracket 4. A light source 7 is disposed within the lamp groove 41. The light source 7 may be a light emitting device such as a light strip or a bulb. A light-transmitting strip 6 covering the lamp groove 41 is provided at the lamp groove 41 on the lamp bracket 4, and the light-transmitting strip 6 includes a first flange 61 engaged with the lamp groove 41; threaded holes are provided on the first flange 61 to fix the light-transmitting strip 6 to the lamp bracket 4 via threaded connection. The light-transmitting strip 6 is made of acrylic material and can have a crystal-like shape, to present the lighting effect of a crystal lamp. An extended end of the first flange 61 is serrated to enhance light diffusion of the light-transmitting strip 6 to improve lighting effects.

Figure 4:
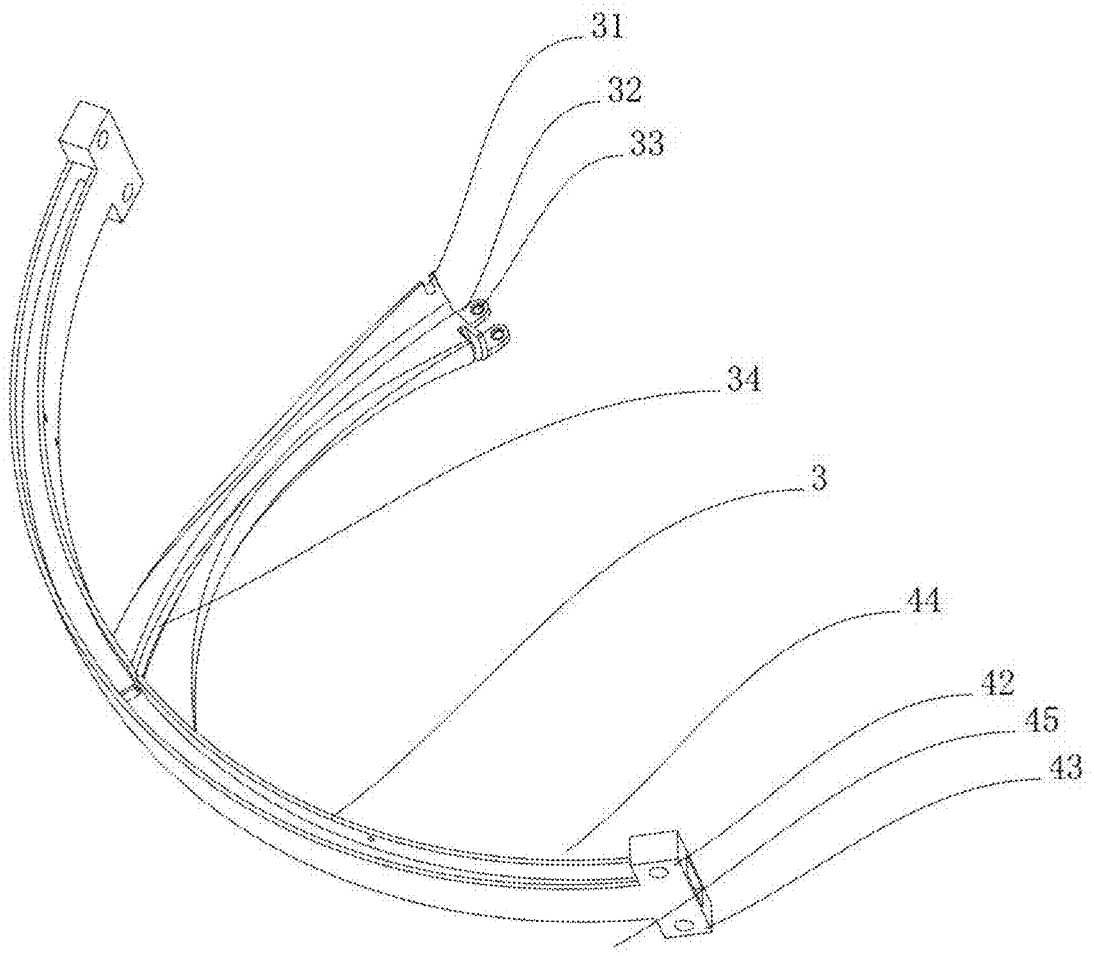
FIG. 4 is a schematic diagram of a light arm and a lamp bracket in Embodiment 1 of the present invention.
Figure 5:
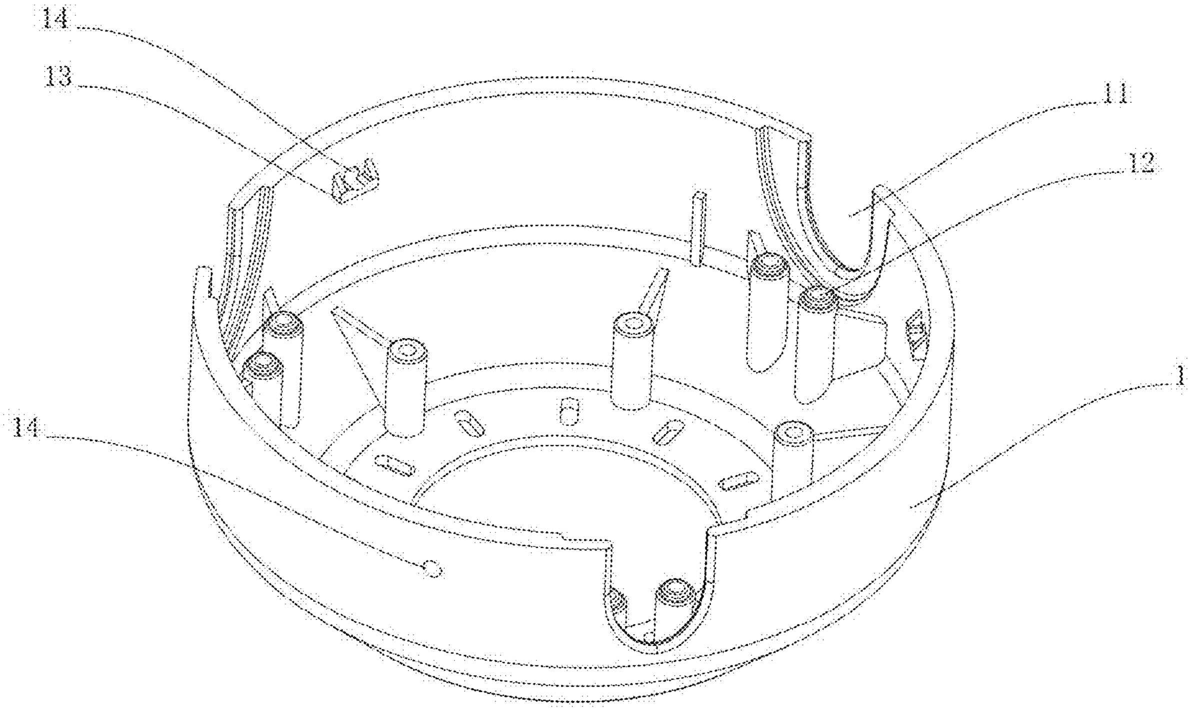
FIG. 5 is a schematic diagram of the ceiling-mounted box in the present invention.

With reference to FIG. 4 and FIG. 5, in this solution, a U-shaped plug 11 is provided on an outer sidewall of the ceiling box 1. A U-shaped socket 31 engaged with the plug 11 is provided on the light arm 3. A second flange 32 is disposed at an end of the light arm 3 connected to the ceiling box 1, a first threaded hole 33 is provided on the second flange 32, a second threaded hole 12 is provided inside the ceiling box 1 to match the first threaded hole 33. This allows the lamp arm 3 to be quickly inserted into the ceiling box 1, and then connected and fixed by threaded connection. A wire channel 34 communicating with the inside of the ceiling box 1 is provided on the upper side of the light arm 3, and an opening connected to the wire channel 34 is provided on the lamp bracket.

Figure 3:
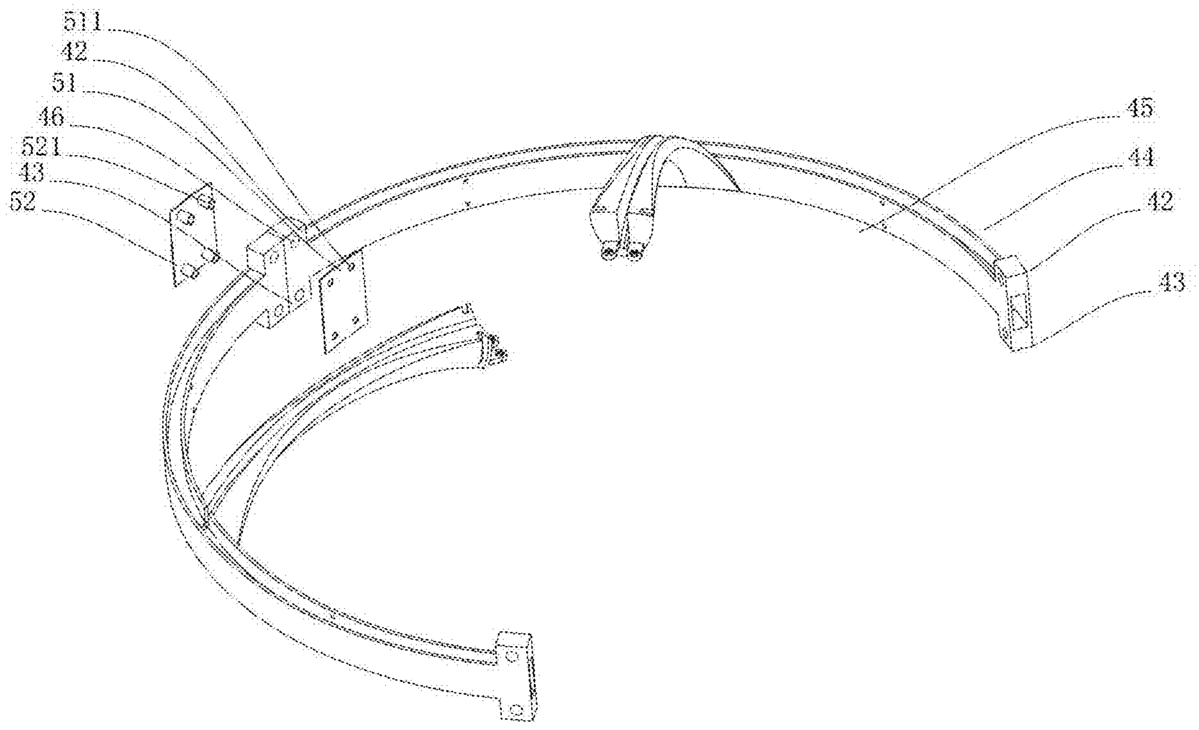
FIG. 3 is a schematic diagram of assembly of connection between two adjacent lamp brackets in Embodiment 1 of the present invention.

With reference to FIG. 3 and FIG. 4, in this solution, when lamp grooves 41 are provided on both upper and lower sides of the lamp bracket 4, a first protrusion 42 is provided on an upper side of both the head end and the tail end of the lamp bracket 4. A second protrusion 43 is provided on a lower side of both the head end and the tail end of the lamp bracket 4. A first accommodation slot 44 for accommodating the light-transmitting strip 6 is formed between the first protrusions 42 at the two ends. A second accommodation slot 45 for accommodating the light-transmitting strip is formed between the second protrusions 43 at the two ends. Certainly, the lamp groove 41 may be provided only on the upper side or lower side of the lamp bracket 4.

With reference to FIG. 1 to FIG. 3, in Embodiment 1 of the present invention, the connecting member 5 includes: a first clamping plate 51 disposed on an inner side of the lamp bracket 4; and a second clamping plate 52 disposed on an outer side of the lamp bracket 4. A first through hole 46 extending outward is provided at the head end and the tail end of the lamp bracket 4. Third threaded holes 511 communicating with the first through holes 46 are provided on both left and right sides of the first clamping plate 51. The third threaded hole 511 at the left side of the first clamping plate communicates with the first through hole 46 on the lamp bracket 4 at the left side, and the third threaded hole 511 at the right side of the first clamping plate communicates with the first through hole 46 on the lamp bracket 4 at the right side. A fourth threaded hole 521 communicating with the first through hole 46 is provided on each of left and right sides of the second clamping plate 52, where the fourth threaded hole 521 at a left side of the second clamping plate communicates with the first through hole 46 on the lamp bracket 4 at the left side, and the fourth threaded hole 521 at the right side of the second clamping plate communicates with the first through hole 46 on the lamp bracket 4 at the right side. The first through holes 46 are respectively provided on upper and lower sides of the lamp bracket 4, where the upper first through hole 46 is provided at the first protrusion 42, and the lower first through hole 46 is provided at the second protrusion 43. In this way, the head end and the tail end of adjacent lamp bracket 4 can be fixedly docked by threaded connection. Certainly, this structure of the connecting member 5 is suitable for arranging the lamp groove 41 on the upper side, the lower side, and the upper and lower sides of the lamp bracket 4.

With reference to FIG. 7 to FIG. 15, in this solution, the connecting member 5 includes: a U-shaped insert groove 53 disposed between adjacent lamp brackets 4; a connection structure 531 is provided between the U-shaped insert groove 53 and the lamp bracket 4 to enable end-to-end docking of adjacent lamp brackets 4. The connection structure 531 operates via snap-fit engagement, threaded connection, magnetic attraction, or the like.

With reference to FIG. 7 to FIG. 15, in Embodiment 2 of the present invention, the connection structure 531 is a tenon-and-mortise connection structure including: a tenon 5311 provided on the U-shaped insert groove 53, and a mortise 5312 provided at the head end and the tail end of the lamp bracket 4. There are at least two tenons 5311 that are provided on the left and right sides. Preferably, when there are four or more tenons 5311, four or more tenons may be arranged in front, rear, left, and right directions. Mortises 5312 at the head end and the tail end of adjacent lamp brackets 4 collectively form a shape matching the tenons 5311, enabling fixed docking of the head end and the tail end of adjacent lamp brackets 4. In addition, an L-shaped groove 62 is provided on each of left and right sides of a bottom of the light-transmitting strip 6; and an elastic fastener 532 engageable with the L-shaped groove 62 is provided on each of left and right sides of the U-shaped insert groove 53, securing the U-shaped insert groove 53 to the light-transmitting strips 6 on two sides and preventing disengagement. Certainly, this structure of the connecting member 5 is suitable for arranging the lamp groove 41 on the lower side of the lamp bracket 4.

With reference to FIG. 11 to FIG. 15, in Embodiment 3 of the present invention, the connection structure 531 is a threaded connection structure including: an H-shaped protrusion 5313 provided on the U-shaped insert groove 53, a T-shaped slot 5314 provided at the head end and the tail end of the lamp bracket 4 and engaged with the H-shaped protrusion 5313, and a locking screw 5315 provided at the head end and the tail end of the lamp bracket 4 to lock the H-shaped protrusion 5313 within the T-shaped slot 5314; a sixth threaded hole 5316 engaged with the locking screw 5315 is provided on the H-shaped protrusion 5313. In this way, T-shaped slots 5314 on lamp brackets 4 on two sides collectively dock to form an H-shaped slot matching the H-shaped protrusion 5313. The head end and the tail end of adjacent lamp brackets 4 are then secured via the locking screw 5315, achieving fixed docking between the head end and the tail end of adjacent lamp brackets 4. Certainly, this structure of the connecting member 5 is suitable for arranging the lamp grooves 41 are on the upper side, the lower side, and both the upper and the lower sides of the lamp bracket 4.

Figure 6:
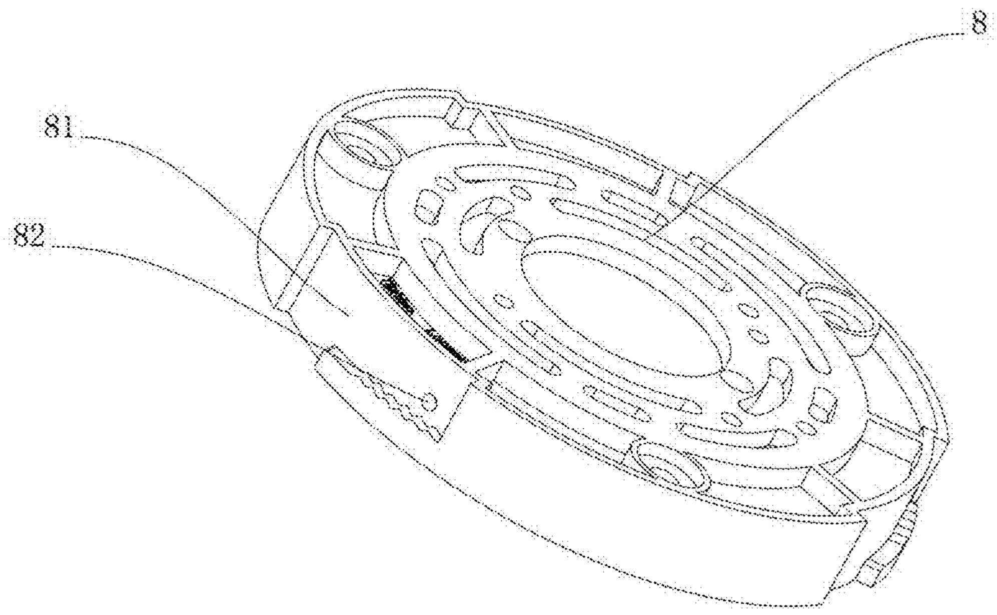
FIG. 6 is a schematic diagram of a ceiling cover in the present invention.
Figure 7:
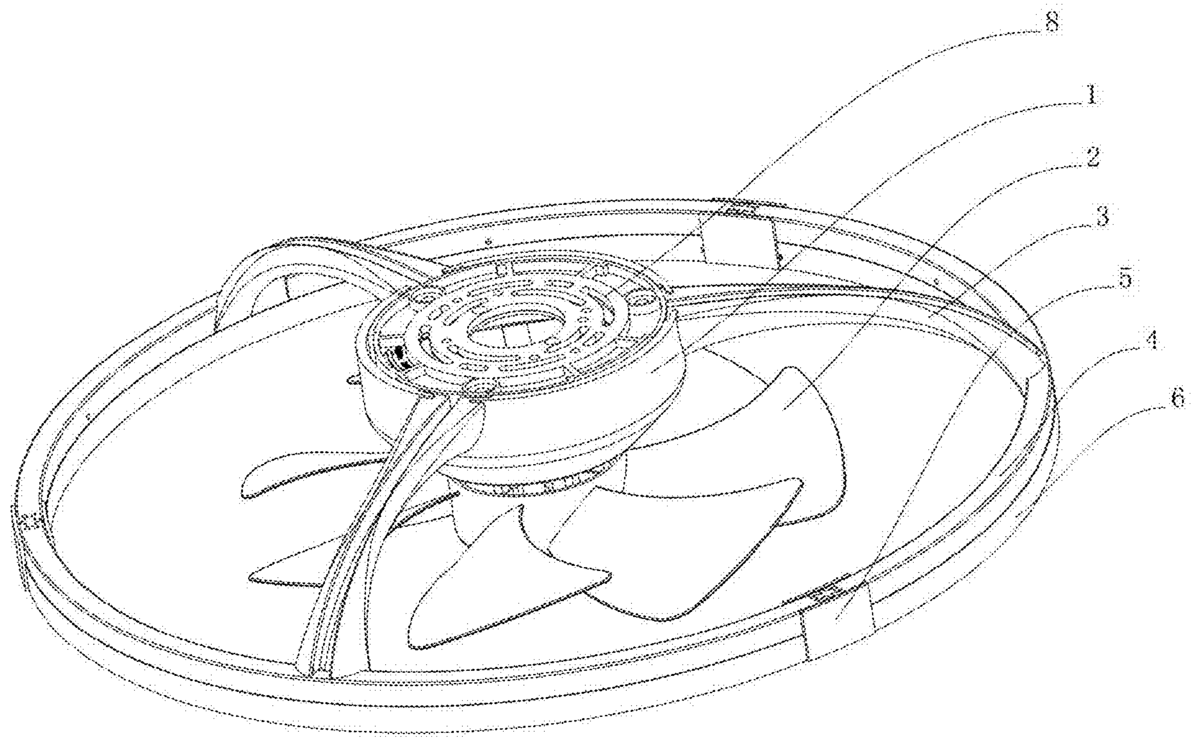
FIG. 7 is a schematic diagram of Embodiment 2 of the present invention.
Figure 8:
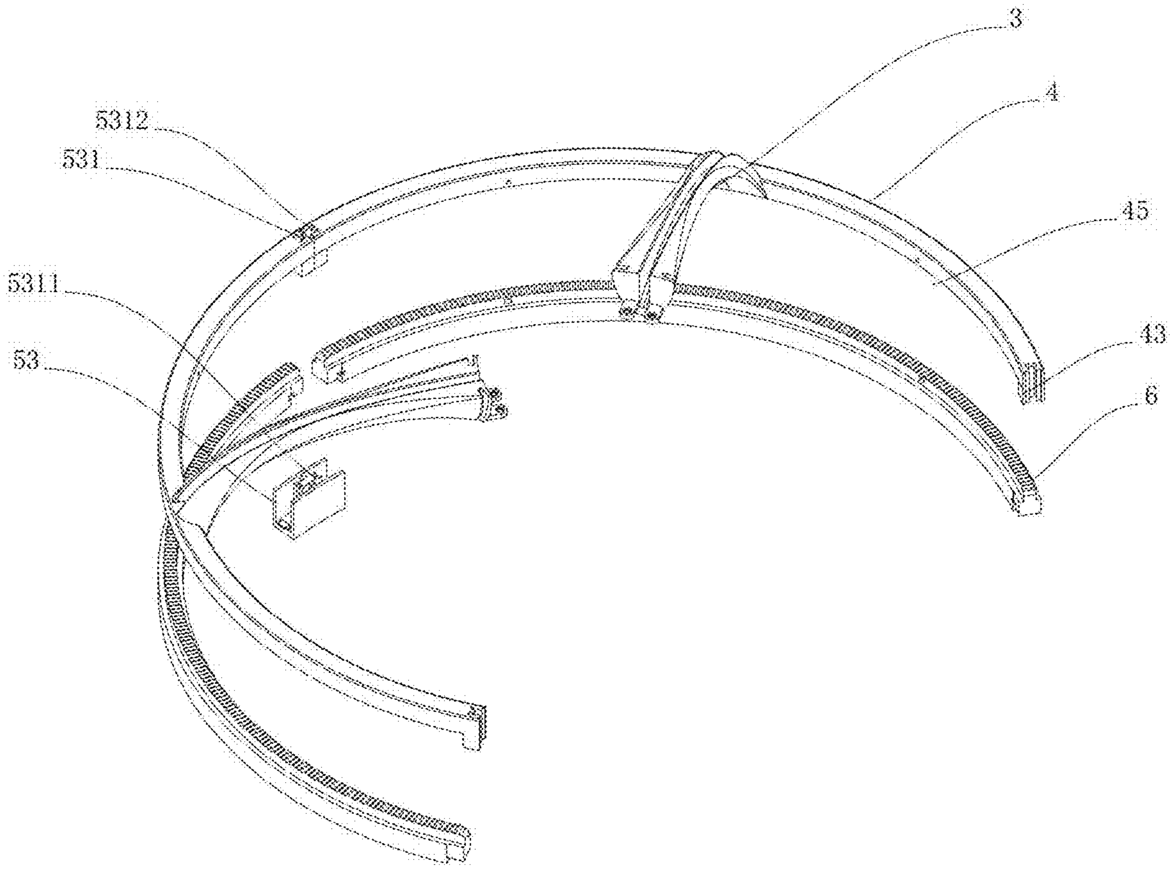
FIG. 8 is a schematic diagram of assembly of connection between two adjacent lamp brackets in Embodiment 2 of the present invention.
Figure 9:
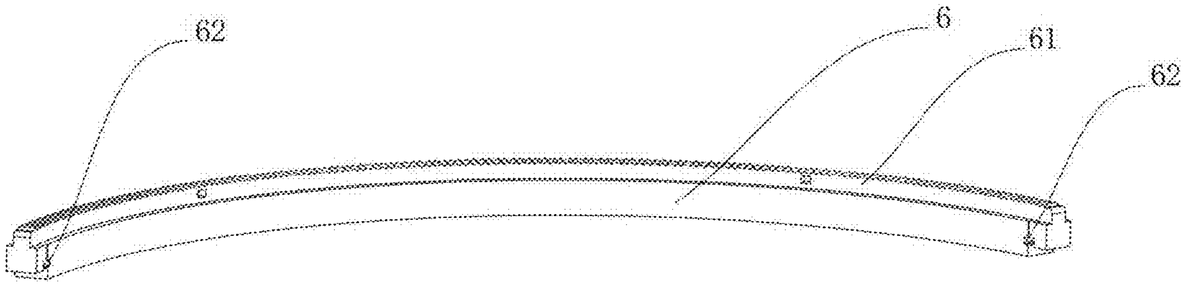
FIG. 9 is a schematic diagram of the light-transmitting strip in Embodiment 2 of the present invention.
Figure 10:
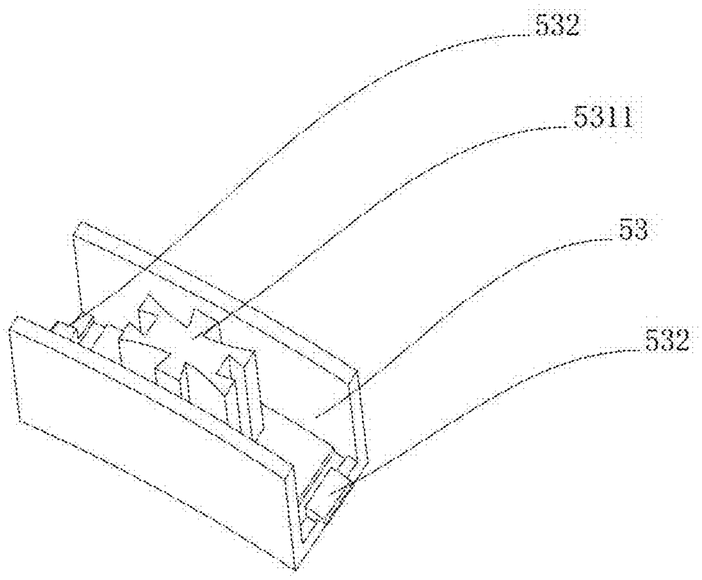
FIG. 10 is a schematic diagram of a U-shaped insert groove in Embodiment 2 of the present invention.
Figure 11:
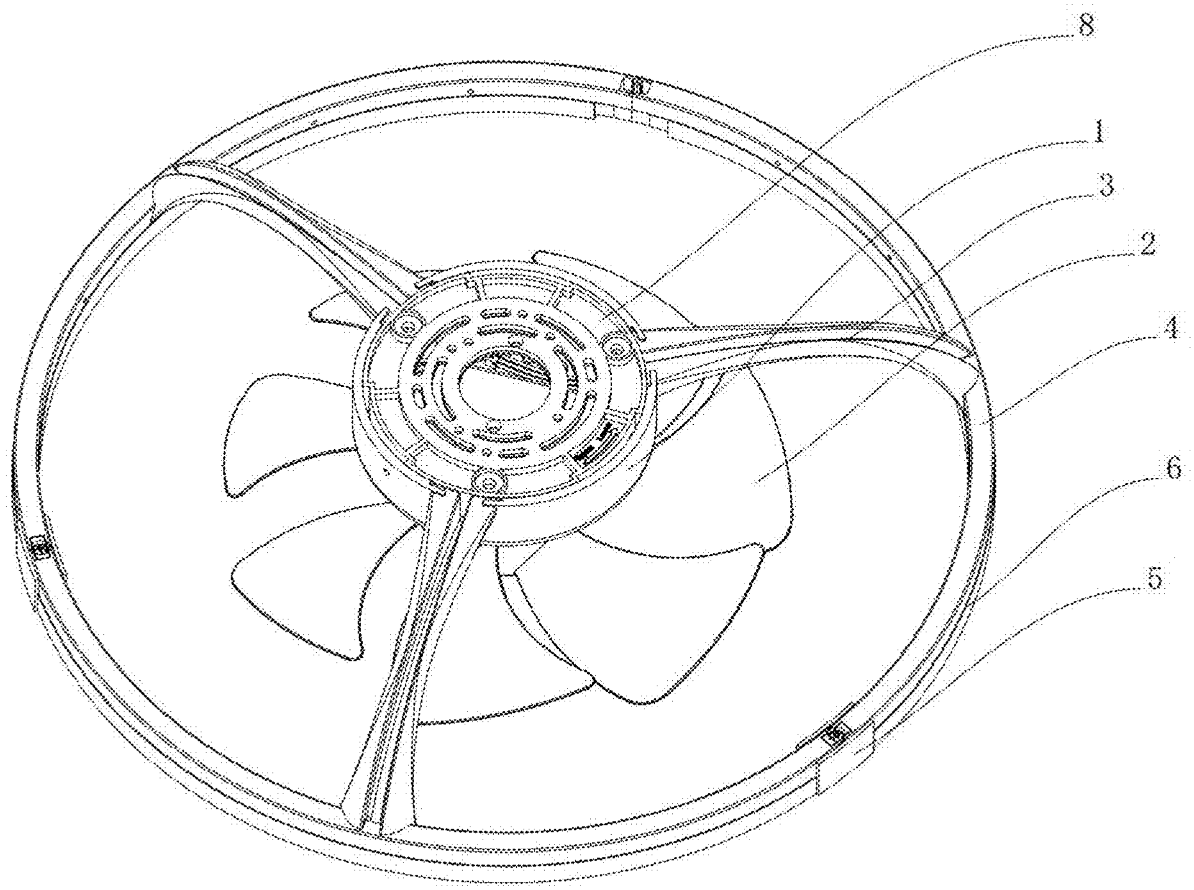
FIG. 11 is a schematic diagram of arranging the lamp groove on the lower side in Embodiment 3 of the present invention.
Figure 12:
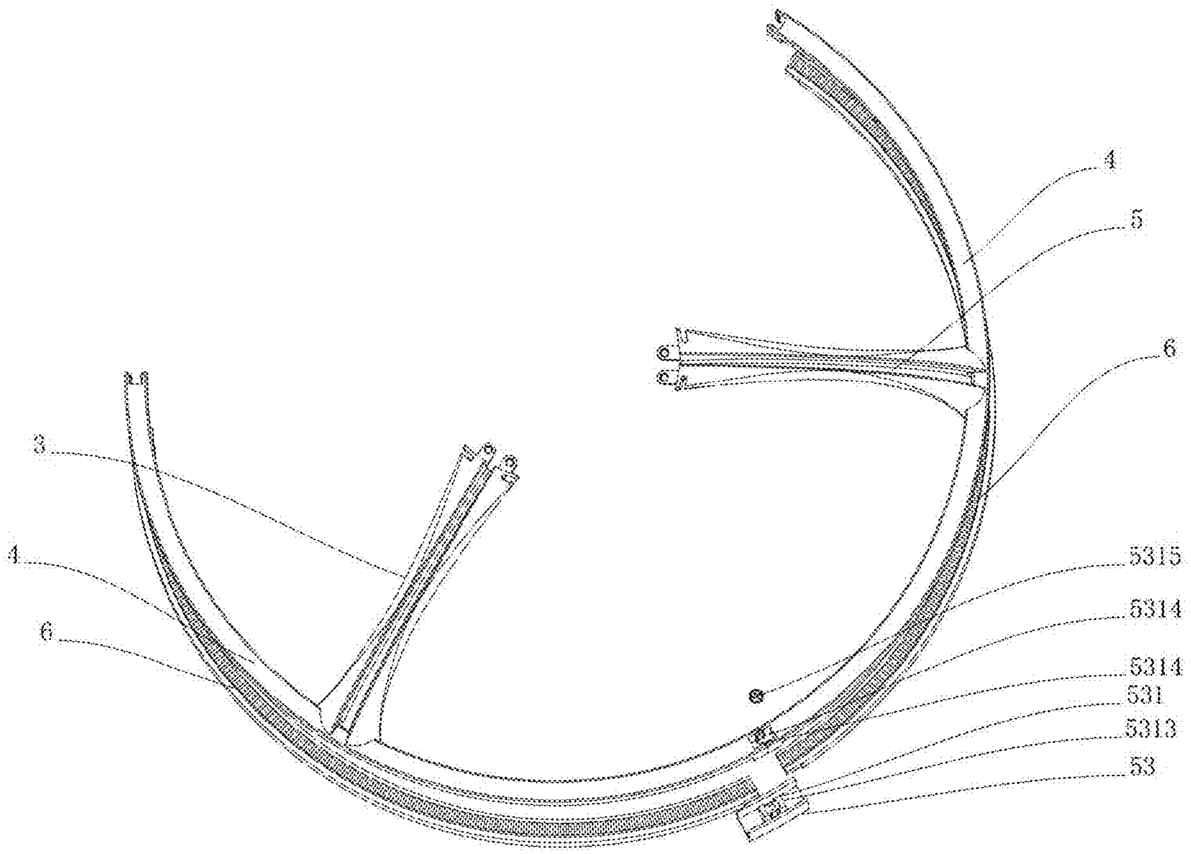
FIG. 12 is a schematic diagram of assembly of connection between two adjacent lamp brackets in FIG. 11.
Figure 13:
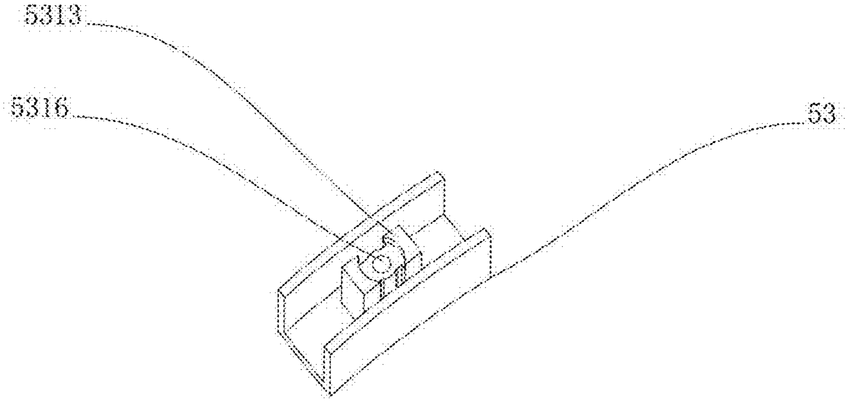
FIG. 13 is a schematic diagram of a U-shaped insert groove in Embodiment 2 of the present invention.
Figure 14:
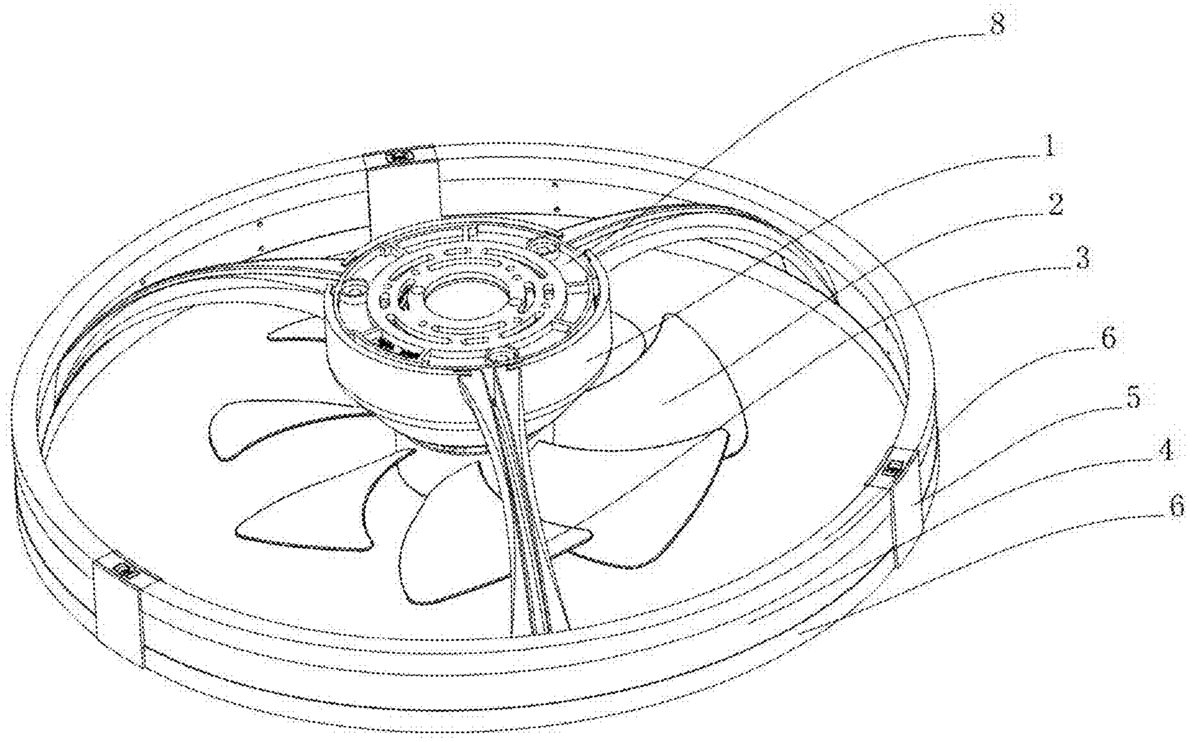
FIG. 14 is a schematic diagram of arranging lamp grooves on both upper and lower sides in Embodiment 3 of the present invention.
Figure 15:
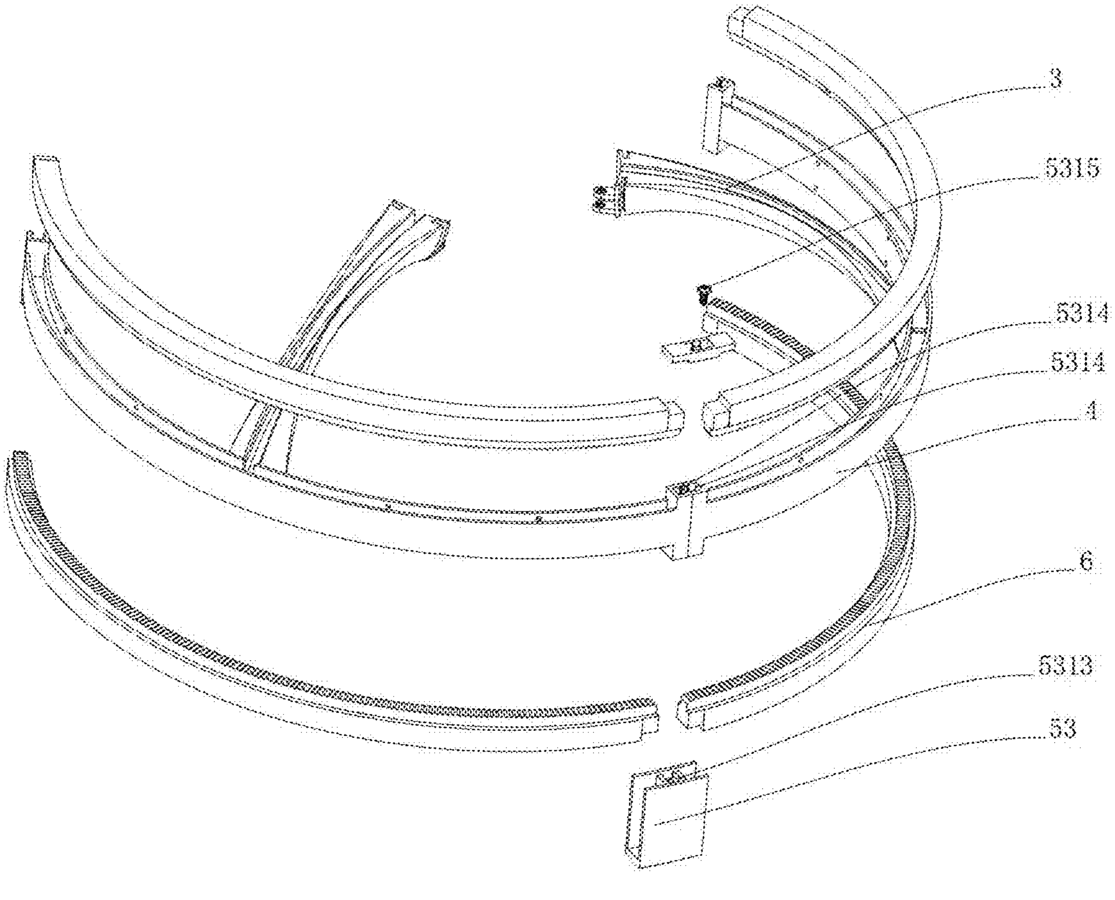
FIG. 15 is a schematic diagram of assembly of connection between two adjacent lamp brackets in the FIG. 14.

Referring to FIG. 5 and FIG. 6, in this solution, a ceiling cover 8 is detachably assembled to the ceiling box 1; an L-shaped groove 81 is provided on an outer sidewall of the ceiling cover 8; a limit protrusion 13 engaged with the L-shaped groove 81 is provided on an inner sidewall of the ceiling box 1; a serrated protrusion that can be engaged with the limit protrusion 13 is provided on the lower sidewall of the L-shaped groove 81, a second through hole 14 is provided on a sidewall of the ceiling box 1 at the limit protrusion position 13; and a fifth threaded hole 82 is provided on the ceiling cover 8. When the L-shaped groove 81 engages with the limit protrusion 13, the fifth threaded hole 82 communicates with the second through hole 14, enabling fixation of the ceiling cover 8 to the ceiling box 1 via threaded connection.

The present invention further provides an assembly method for a ceiling-mounted fan light, adopting the fan light as described above. The assembly method includes the following steps:

S101. Assemble the light arms 3 with the ceiling box 1: align the U-shaped socket 31 on the light arm 3 with the plug 11 on the outer sidewall of the ceiling box 1 for snap-fit engagement, the first threaded hole 33 on the second flange 32 at the end of the light arm 3 connected to the ceiling box 1 is aligned with the second threaded hole 12 inside the ceiling box 1, and secure the light arms 3 to the ceiling box 1 by threaded connection using screws;

S102. Assemble the lamp bracket 4, the light-transmitting strip 6, and the light source 7: adhere the light source 7 to the bottom surface of the lamp groove 41, cover the lamp groove 41 with the light-transmitting strip 6, and fix it to the lamp bracket 4 by threaded connection through the threaded hole on the first flange 61;

S103. Assemble lamp brackets 4: dock the head end of one lamp bracket 4 with the tail end of an adjacent lamp bracket, and connect the head end of one lamp bracket 4 to the tail end of an adjacent lamp bracket through a connecting member 5; to connect the lamp brackets 4 into a ring.

In an assembly method of Embodiment 1, at the head end and the tail end of adjacent lamp brackets 4, the inner side of the first clamping plate 51 is first aligned with the inner side of the lamp bracket 4, where the third threaded holes 511 on both left and right sides communicate with the first through holes 46 on the lamp bracket 4 (located at the first protrusion 42 and second protrusion 43 on upper and lower sides of the lamp bracket 4), after which the outer side of the second clamping plate 52 is aligned with the outer side of the lamp bracket 4, where fourth threaded holes 521 on both left and right sides also communicate with the first through holes 46 of the lamp bracket 4. Screws pass through first through holes 46 to implement threaded connection to the third threaded holes 511 and the fourth threaded holes 521, to ensure fixed docking of the head end and the tail end of adjacent lamp brackets 4.

In an assembly method of Embodiment 2, the U-shaped insert groove 53 is inserted between adjacent lamp brackets 4, where the tenon 5311 of the U-shaped insert groove 53 is inserted in alignment with mortises 5312 at the head end and the tail end of the lamp brackets 4, achieving fixed docking of the head end and the tail end of lamp brackets 4 via tenon-mortise engagement. In addition, elastic clips 532 on both left and right sides of the U-shaped insert groove 53 are engaged into L-shaped grooves 62 at the bottom left and right sides of the light-transmitting strip 6, preventing dislodgment of the U-shaped insert groove 53.

In an assembly method of Embodiment 3, the H-shaped protrusion 5313 on the U-shaped insert groove 53 is inserted into T-shaped slots 5314 at the head and tail ends of the lamp brackets 4, T-shaped slots 5314 on two sides of the lamp brackets 4 are aligned to form an H-shaped groove matching the H-shaped protrusion 5313, and a locking screw passes through holes on the lamp bracket 4 to implement threaded connection to the sixth threaded hole 5316 on the H-shaped protrusion 5313, to ensure fixed docking of the head end and the tail end of adjacent lamp brackets 4.

S104. Assemble the ceiling cover 8 with the ceiling box 1: after assembling a drive motor into the ceiling box 1, align the L-shaped groove on the ceiling cover 8 with the limit protrusion 13 on the inner sidewall of the ceiling box 1, to clamp the serrated protrusion on the lower sidewall of the L-shaped groove to the limit protrusion 13, where the fifth threaded hole 82 on the ceiling cover 8 communicates with the second through hole 14 at the limit protrusion 13 on the sidewall of the ceiling box 1, secure the ceiling cover 8 to the ceiling box 1 by threaded connection using screws, and mount the fan 2 onto the ceiling box 1 to ensure drive connection to the drive motor.

What is claimed is:

1. A ceiling-mounted fan light, comprising a ceiling box and a fan arranged on the ceiling box, characterized in that a plurality of light arms are detachably assembled to the ceiling box; an arc-shaped lamp bracket is provided at an extended end of each light arm; the lamp bracket comprises a head end and a tail end, and a connecting member is arranged between the head end of one lamp bracket and the tail end of an adjacent lamp bracket to enable a connection between the lamp bracket and the adjacent lamp bracket; the connection between the lamp bracket and the adjacent lamp bracket forms a ring;

at least one of a lower side and an upper side of the lamp bracket is provided with a lamp groove; a light source is disposed within the lamp groove; and a light-transmitting strip covering the lamp groove is provided at the lamp groove on the lamp bracket, the light-transmitting strip comprises a first flange engaged with the lamp groove; and a plug is provided on an outer sidewall of the ceiling box; a socket engaged with the plug is provided on the light arm; a second flange is provided at an end of the light arm connected to the ceiling box, the second flange is provided with a first threaded hole; and a second threaded hole is provided within the ceiling box to match the first threaded hole.

2. The ceiling-mounted fan light according to claim 1, characterized in that the connecting member comprises a first clamping plate disposed on an inner side of the lamp bracket and a second clamping plate disposed on an outer side of the lamp bracket; a first through hole extending outward is provided at the head end and the tail end of the lamp bracket; a third threaded hole communicating with the first through hole is provided on each of left and right sides of the first clamping plate, wherein the third threaded hole at a left side of the first clamping plate communicates with the first through hole on the lamp bracket at a left side, and the third threaded hole at a right side of the first clamping plate communicates with the first through hole on the lamp bracket at a right side; and a fourth threaded hole communicating with the first through hole is provided on each of left and right sides of the second clamping plate, wherein the fourth threaded hole at a left side of the second clamping plate communicates with the first through hole on the lamp bracket at the left side, and the fourth threaded hole at the right side of the second clamping plate communicates with the first through hole on the lamp bracket at the right side.

3. The ceiling-mounted fan light according to claim 2, characterized in that the lamp groove is provided on both upper and lower sides of the lamp bracket; a first protrusion is provided on an upper side of both the head end and the tail end of the lamp bracket; a second protrusion is provided on a lower side of each of two ends of the lamp bracket; a first slot for mounting the light-transmitting strip is formed between the first protrusions at both ends; and a second slot for mounting the light-transmitting strip is formed between the second protrusions at both ends.

4. The ceiling-mounted fan light according to claim 3, characterized in that the first through holes are respectively provided on upper and lower sides of the lamp bracket, wherein the upper first through hole is provided at the first protrusion, and the lower first through hole is provided at the second protrusion.

5. The ceiling-mounted fan light according to claim 1, characterized in that the connecting member comprises a U-shaped insert groove disposed between adjacent lamp brackets; and a connection member is provided between the U-shaped insert groove and the lamp bracket to enable end-to-end docking of adjacent lamp brackets.

6. The ceiling-mounted fan light according to claim 5, characterized in that the connection structure is a tenon-and-mortise connection structure comprising: a tenon provided on the U-shaped insert groove, and a mortise provided at the head end and the tail end of the lamp bracket and riveted to the tenon; an L-shaped groove is provided on each of left and right sides of a bottom of the light-transmitting strip; and an elastic fastener engageable with the L-shaped groove is provided on each of left and right sides of the U-shaped insert groove.

7. The ceiling-mounted fan light according to claim 5, characterized in that the connection structure is a threaded connection structure comprising: an H-shaped protrusion provided on the U-shaped insert groove, a T-shaped slot provided at the head end and the tail end of the lamp bracket and engaged with the H-shaped protrusion, and a locking screw provided at the head end and the tail end of the lamp bracket to lock the H-shaped protrusion within the T-shaped slot; a sixth threaded hole engaged with the locking screw is provided on the H-shaped protrusion.

8. The ceiling-mounted fan light according to claim 1, characterized in that a ceiling cover is detachably assembled to the ceiling box; an L-shaped groove is provided on an outer sidewall of the ceiling cover; a limit protrusion engaged with the L-shaped groove is provided on an inner sidewall of the ceiling box; a second through hole is provided on a sidewall of the ceiling box at the limit protrusion position; and a fifth threaded hole communicating with the second through hole is provided on the ceiling cover.

9. An assembly method for a ceiling-mounted fan light, characterized by adopting the ceiling-mounted fan light according to claim 8, wherein the assembly method comprises following steps:

S101: assembling the light arms with the ceiling box: aligning the socket on the light arm with the plug on the outer sidewall of the ceiling box for snap-fit engagement, the first threaded hole on the second flange at the end of the light arm connected to the ceiling box is aligned with the second threaded hole inside the ceiling box, and securing the light arms to the ceiling box by threaded connection using screws;

S102: assembling the lamp bracket, the light-transmitting strip, and the light source: adhering the light source to the bottom surface of the lamp groove, covering the lamp groove with the light-transmitting strip, and fixing it to the lamp bracket by threaded connection through the threaded hole on the first flange;

S103: assembling lamp brackets: docking the head end of one lamp bracket with the tail end of an adjacent lamp bracket, and connecting the head end of one lamp bracket and the tail end of an adjacent lamp bracket through a connecting member; to connect the lamp brackets into a ring; and S104: assembling the ceiling cover with the ceiling box: aligning the L-shaped groove on the ceiling cover with the limit protrusion on the inner sidewall of the ceiling box, to clamp the serrated protrusion on the lower sidewall of the L-shaped groove to the limit protrusion, wherein the fifth threaded hole on the ceiling cover communicates with the second through hole at the limit protrusion on the sidewall of the ceiling box, securing the ceiling cover to the ceiling box by threaded connection using screws, and mounting the fan onto the ceiling box.

* * * * *